(12) United States Patent
Umezu (10) Patent No.: US 7,460,775 B2
(45) Date of Patent: Dec. 2, 2008

(54) OPTICAL APPARATUS INCLUDING EFFICIENTLY ARRANGED SHAKE CORRECTION MEANS

(75) Inventor: Takuji Umezu, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 11/258,329

(22) Filed: Oct. 25, 2005

(65) Prior Publication Data

US 2006/0093339 A1   May 4, 2006

(30) Foreign Application Priority Data

Nov. 1, 2004   (JP) ............................. 2004-318120

(51) Int. Cl.
*G03B 17/00* (2006.01)
(52) U.S. Cl. ......................................... 396/55; 359/557
(58) Field of Classification Search ................. 359/694, 359/696, 823, 824, 555–557; 396/52, 55, 396/133, 358; 348/208.99
See application file for complete search history.

(56) References Cited

U.S. PATENT DOCUMENTS

| | | | | |
|---|---|---|---|---|
| 5,966,248 A | * | 10/1999 | Kurokawa et al. | 359/697 |
| 6,008,954 A | | 12/1999 | Shintani et al. | |
| 6,819,500 B2 | * | 11/2004 | Tsuzuki | 359/696 |
| 2005/0168834 A1 | * | 8/2005 | Matsumoto et al. | 359/694 |
| 2006/0045516 A1 | * | 3/2006 | Ishizuka et al. | 396/349 |

\* cited by examiner

*Primary Examiner*—Christopher E Mahoney
*Assistant Examiner*—Autumn Parker
(74) *Attorney, Agent, or Firm*—Cowan, Liebowitz & Latman, P.C.

(57) ABSTRACT

An optical apparatus includes a shift unit portion 3 holding a lens that can bend a photographing optical axis when driven in a plane orthogonal to an optical axis A and a variator moving frame that moves in the optical axis direction. A part of driving means for driving the shift unit portion 3 having a hand shake correction function and a part of a lens held by the variator moving frame 7 are arranged to overlap with each other in a plane orthogonal to the optical axis A. Thus, the apparatus can be made compact.

6 Claims, 7 Drawing Sheets

OPTICAL APPARATUS INCLUDING EFFICIENTLY ARRANGED SHAKE CORRECTION MEANS

BACKGROUND OF THE INVENTION

1. Field of the Invention

The present invention relates to an optical apparatus such as an image pickup apparatus like a video camera or a digital still camera and an interchangeable lens apparatus.

2. Related Background Art

Many image pickup apparatuses and interchangeable lens apparatuses are equipped with a shake correction apparatus in which a lens is moved in a direction(s) orthogonal to the optical axis to bend the optical axis of the photographing optical system to thereby correct image shake caused, for example, by hand-shake.

There is a known type of such a shake correction apparatus that is constructed in such a way that a part of the shake correction apparatus laps over another movable lens frame or a part of another movable lens frame laps over a part of the shake correction apparatus in a plane orthogonal to the optical axis to utilize the interior space of the lens barrel efficiently, as disclosed in U.S. Pat. No. 6,008,954. In such a shake correction apparatus, a driving force generating portion such as a magnet or a coil is generally disposed coplanar with the driven glass with respect to directions orthogonal to the optical axis.

However, in cases where a light amount adjusting unit is disposed on the inside of the driven glass, disposing a coil or a magnet on the outisde of the light amount adjusting apparatus to avoid interference therewith will lead to an undesirable increase in the diameter of the shake correction apparatus.

SUMMARY OF THE INVENTION

An object of the present invention is to eliminate the above-described problem to provide a small-size optical apparatus in which shake correction means is efficiently arranged in the interior thereof.

An optical apparatus according to the present invention that achieves the above object is technically characterized by a first movable lens frame that holds a lens that deflects imaging light beams when driven in a plane orthogonal to an optical axis by driving units and a second movable lens frame movable in a direction parallel to said optical axis, wherein a part of a lens held by said second movable lens frame is arranged to overlap said driving units in a plane orthogonal to said optical axis.

According to the optical apparatus of the present invention, it is possible to arrange vibration correction units in an available space efficiently, and the apparatus can be made compact.

DESCRIPTION OF THE PREFERRED EMBODIMENTS

The present invention will be described in detail based on an illustrated embodiment.

Figure 1:
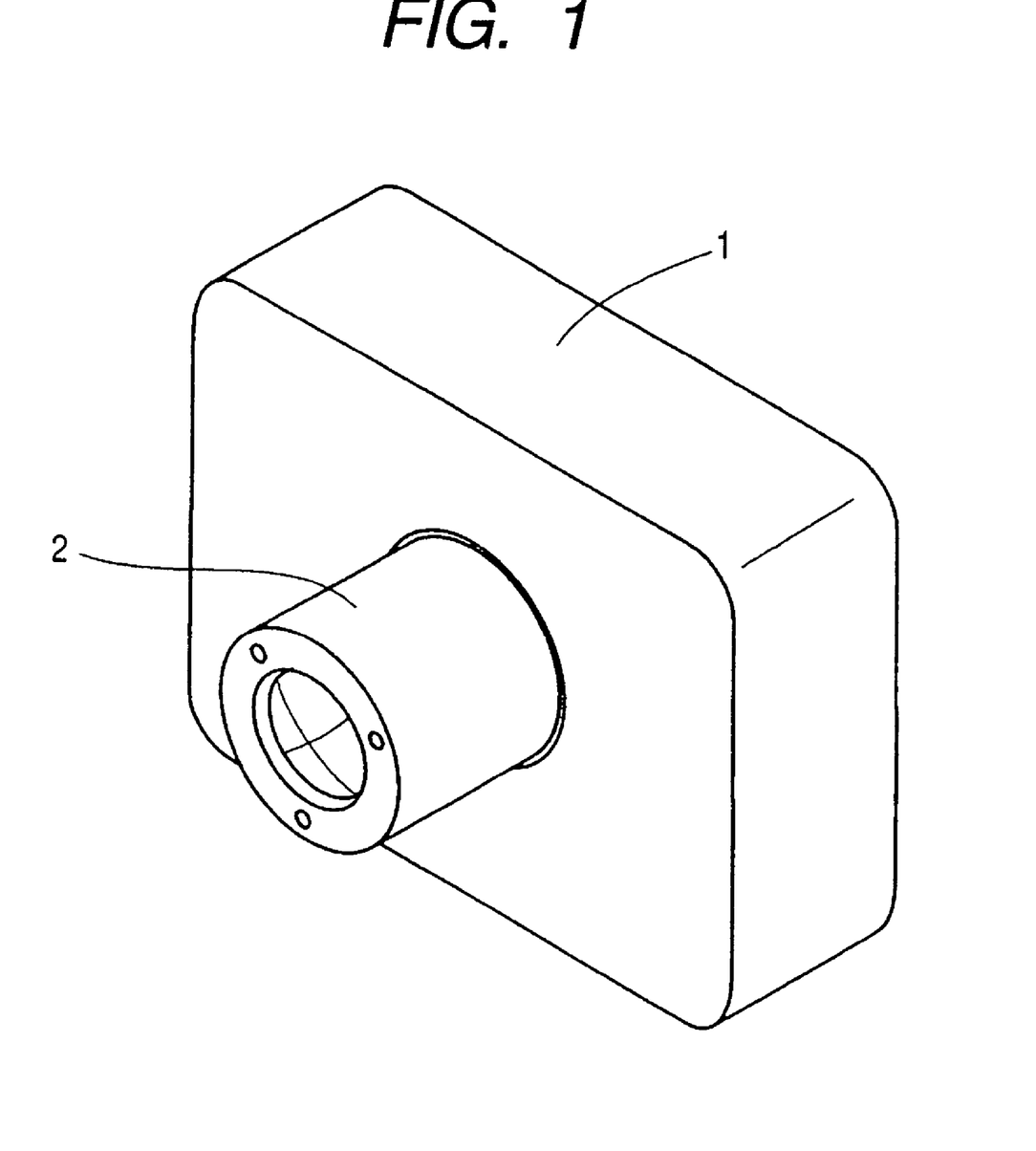
FIG. 1 is a perspective view of a camera according to an embodiment of the present invention.

FIG. 1 is a perspective view of a camera as an embodiment of the present invention. In the camera body 1, provided is a silver-halide film or an image pickup element for recording an image of an object formed thereon by an imaging optical system provided in the interior of a zoom lens barrel 2.

Figure 2:
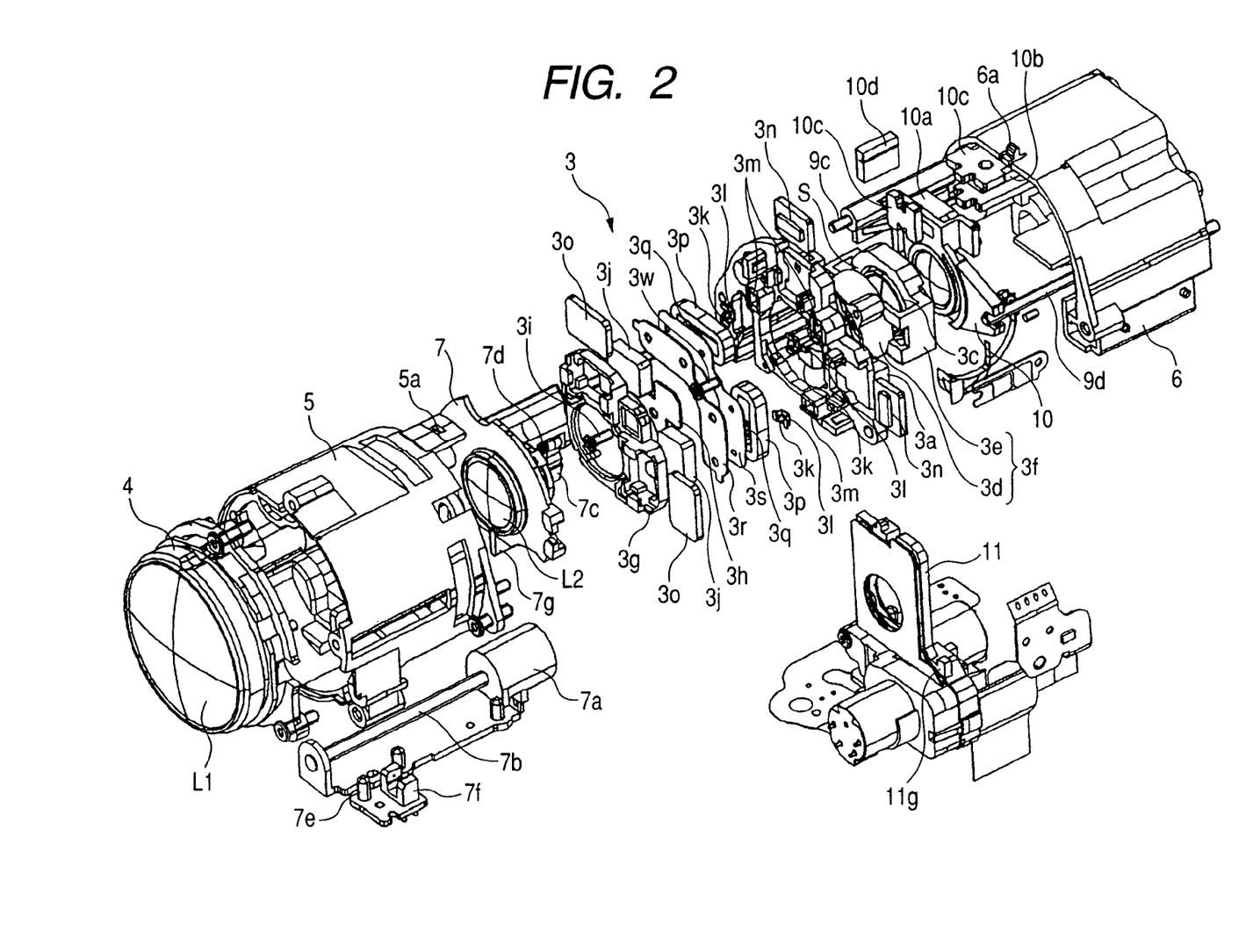
FIG. 2 is an exploded perspective view of a lens barrel mounted on a camera.
Figure 3:
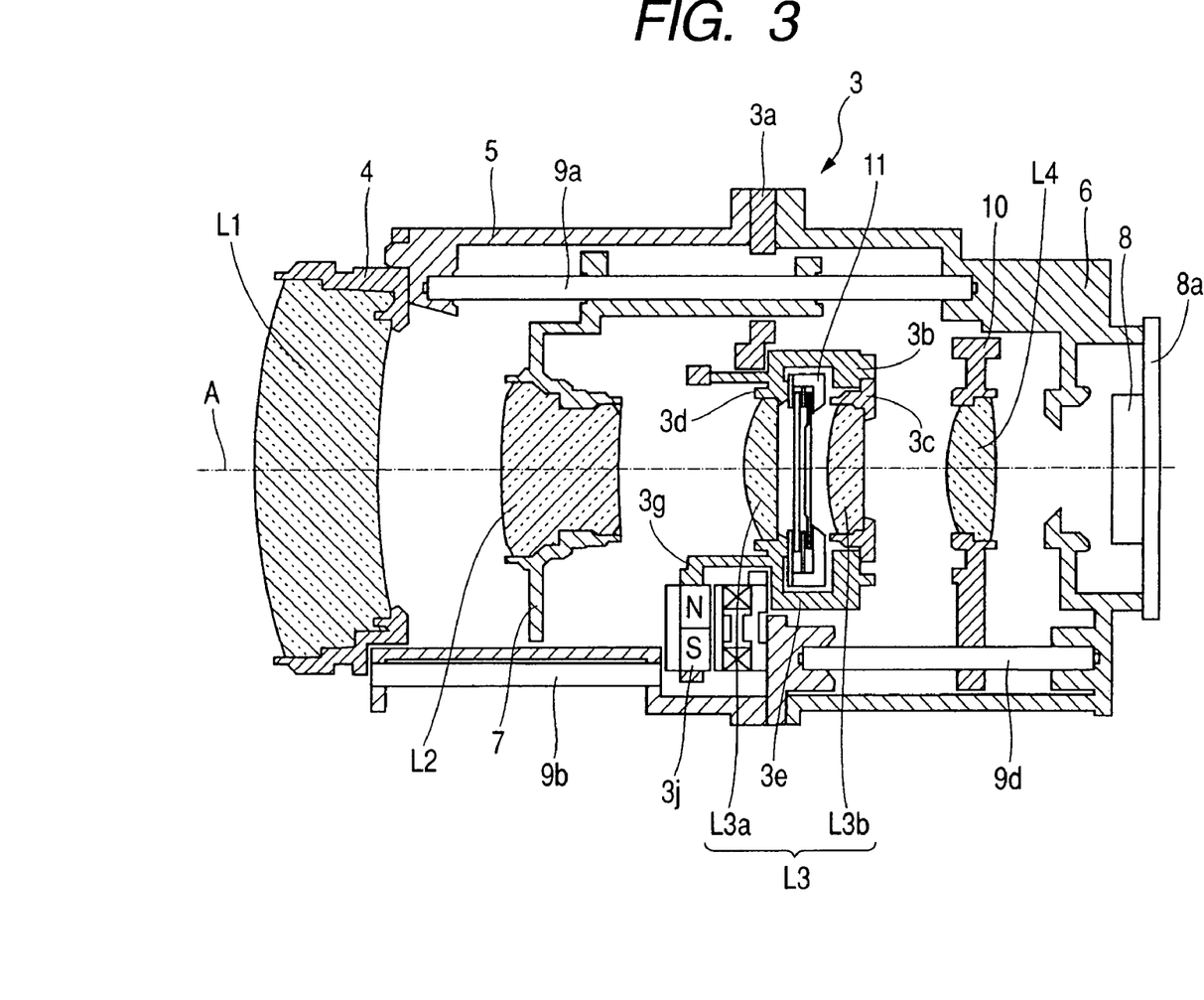
FIG. 3 is a cross sectional view of the lens barrel.

FIG. 2 is an exploded perspective view of the lens barrel 2. FIG. 3 is a cross sectional view of the lens barrel 2. The photographing optical system has a lens optical system composed of, in order from the object side, the convex first lens unit L1, the concave second lens unit L2, the convex third lens unit L3 and the convex fourth lens unit L4.

Figure 4:
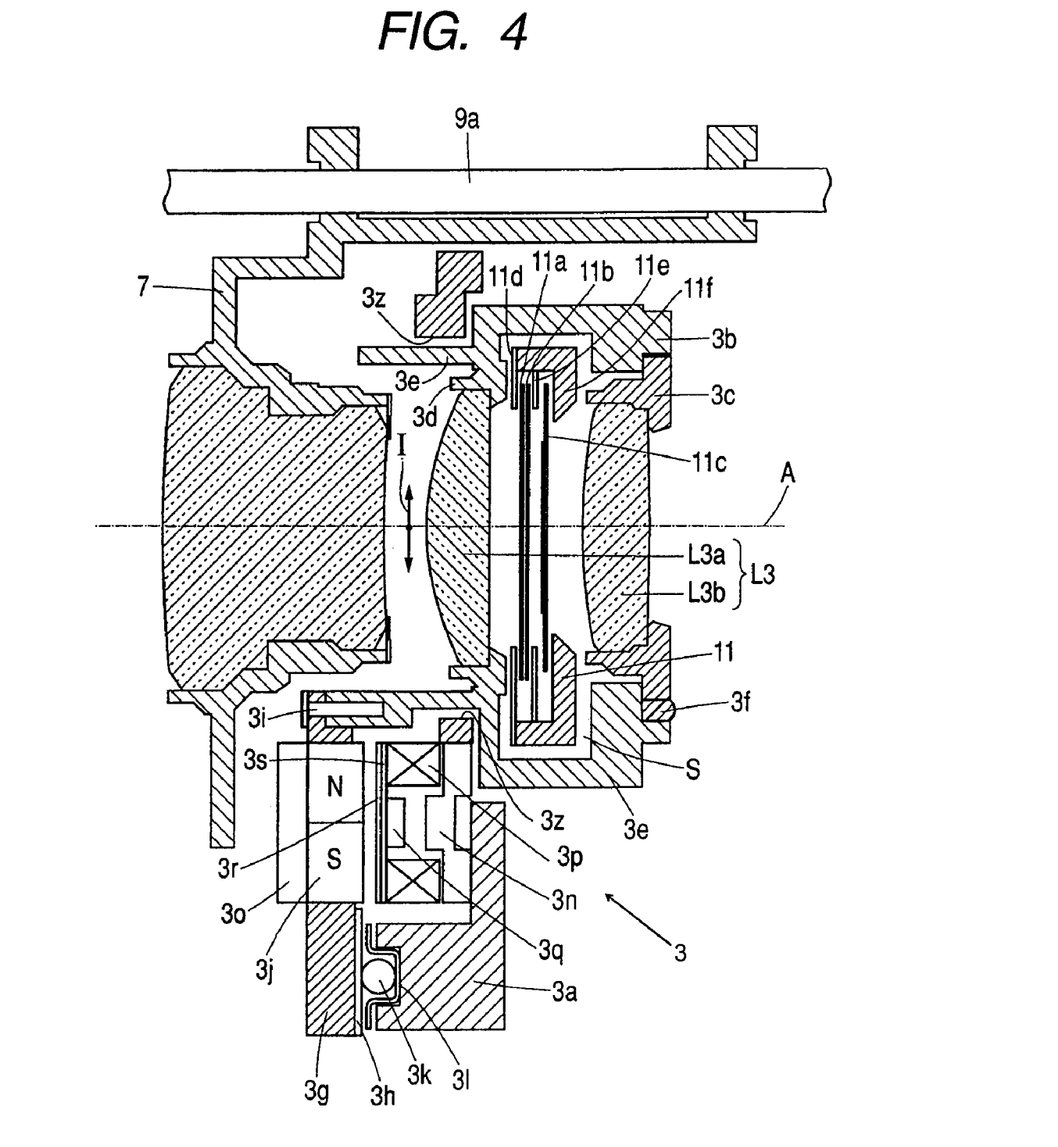
FIG. 4 is a cross sectional view of a shift unit portion.

FIG. 4 is a cross sectional view of a shift unit portion 3 serving as a shake correction apparatus and a lens mechanism and also shows a cross sectional view of the second lens unit L2 in a telelphoto position.

The second lens unit L2 is adapted to move in the optical axis direction to effect the zoom function. The third lens unit L3 is adapted to move in an optical-axis-orthogonal plane (i.e. a plane substantially orthogonal to the optical axis A), namely in optical-axis-orthogonal directions (i.e. directions substantially orthogonal to the optical axis A) to effect the shake correction function.

The third lens unit L3 is composed of two lens subunits, namely, "first lens subunit L3a" disposed on the object side and "second lens subunit L3b" disposed on the image plane side. The fourth lens unit L4 is adapted to move along the optical axis direction to effect focal point adjustment function.

The first lens unit L1 is held by a front lens barrel 4. A fixed lens barrel 5 fixed at a predetermined position is coupled to the rear end of the front lens barrel 4. The rear end of the fixed lens barrel 5 coupled to the rear portion of the front lens barrel 4 is coupled to a shift base 3a that serves as a base member of a shift unit portion 3. A rear lens barrel 6 is coupled to the shift base 3a.

The second lens unit L2 is held by a variator moving frame 7. The first lens subunit L3a and the second lens subunit L3b are integrally held by the shift unit portion 3, which is adapted to move these lens subunits in directions orthogonal to the optical axis.

An image pickup element 8 such as a CCD sensor or a CMOS sensor is mounted on the rear lens barrel 6 by means of an intermediate member 8a. The intermediate member 8a is screwed to the rear lens barrel 6 after the image pickup element 8 has been fixed thereon by, for example, adhesive.

A first guide bar 9a is held between the fixed lens barrel 5 and the rear lens barrel 6. A second guide bar 9b is press-fitted in the fixed lens barrel 5.

Third and fourth guide bars 9c and 9d are held between the shift base 3a and the rear lens barrel 6.

The variator moving frame 7 is supported by the first and the second guide bars 9a and 9b in such a way as to be movable in the optical axis direction. A focus moving frame 10 that holds the fourth lens unit L4 is supported by the third and the fourth guide bars 9c and 9d in such a way as to be movable in the optical axis direction.

The shift base 3a of the shift unit portion 3 is sandwiched between and connected with the rear lens barrel 6 and the fixed lens barrel 5 after it is positioned relative to the fixed lens barrel 5. In the shift unit portion 3, there is provided a light amount adjusting unit 11 for changing the quantity of light entering the photographing optical system. The light amount adjusting unit 11 is fixed on the shift base 3a by a screw and adapted to move two diaphragm blades 11a and 11b in directions orthogonal to the optical axis to change the aperture diameter.

In the light amount adjusting unit 11, there is provided dual density ND filter 11c that can be inserted into and retracted from the optical path independently from the diaphragm blades 11a and 11b.

The rear lens barrel 6 is positioned relative to the fixed lens barrel 5 and fixedly secured to it by screws from the rear side together with the shift base 3a sandwiched therebetween as described above, wherein an engagement hole 5a formed on the upper portion of the rear end of the fixed lens barrel 5 and an engagement projection 6a formed on the upper portion of the front end of the rear lens barrel 6 engages each other.

The focus moving frame 10 in which the fourth lens unit L4 is fixed is driven in the optical axis direction by a focusing motor composed of a voice coil motor. The focusing motor is composed of a coil 10a, a drive magnet 10b and a yoke member 10c. When a current flows through the coil 10a, a Lorentz force is generated as a result of repulsion between lines of magnetic force generated between the magnet 10b and the coil 10a, which drives the focus moving frame 10 in the optical axis direction.

A sensor magnet (not shown) magnetized in the optical axis direction with multiple poles is held by the focus moving frame 10. At apposition on the rear lens barrel 5 opposed to the sensor magnet, an MR sensor 10d is fixed by screws, the MR sensor 10d detecting changes in the lines of magnetic force caused by movement of the sensor magnet.

By using a signal output from the MR sensor 10d, it is possible to detect a movement amount of the focus moving frame 10 or the fourth lens unit L4 from a predetermined reference position.

The variator moving frame 7 on which the second lens unit L2 is fixed is driven in the optical axis direction by a stepping motor 7a serving as a zoom motor.

The stepping motor 7a is fixed on the fixed lens barrel 5 by screws via a support member. On the output shaft of the stepping motor 7a, a lead screw 7b is formed.

The lead screw 7b is meshing with a rack 7c attached on the variator moving frame 7. Thus, when the lead screw 7b is rotated with power supply to the stepping motor 7a, the second lens unit L2 is driven in the optical axis direction together with the variator moving frame 7.

Backlash between the parts such as the rack 7c, the variator moving frame 7, the first and the second guide bars 9a and 9b and the lead screw 7b is eliminated by biasing force applied by a torsion coil spring 7d.

A zoom reset switch 7f composed of a photo interrupter is fixed on the fixed lens barrel 5 by a screw 7e via a substrate. The zoom reset switch 7f is adapted to detect the reference position of the variator moving frame 7 and detect switching between the light interruption state and the light transmission state caused by movement of the light shielding portion 7g, which is formed on the variator moving frame 7, in the optical axis direction.

In the shift unit portion 3, the first lens subunit L3a and the second lens subunit L3b are driven in a plane orthogonal to the optical axis by a pitch drive actuator for correcting image shake due to angle changes in the pitch direction or the vertical direction of the camera and a yaw drive actuator for correcting image shake due to angle changes in the yaw direction or the horizontal direction of the camera.

The camera body 1 is equipped with a two-direction shake sensor composed of a vibration gyro for detecting angle changes in the pitch and yaw directions.

A control circuit such as a CPU for effecting overall control of the camera is adapted to control the actuators based on outputs from these shake sensors and signals from position sensors that detects the positions of the first lens subunit L3a and the second lens subunit L3b in the optical-axis-orthogonal plane. The pitch direction actuator and the yaw direction actuator are driven independently from each other.

While the actuator and position sensor for the pitch direction and the actuator and position sensor for the yaw direction are disposed in such a way as to form an angle of 90 degrees, they have the same structure. Accordingly, the following description will be directed only to the yaw direction.

The first lens subunit L3a is held by the first shift lens barrel 3b of the shift unit portion 3, and the second lens subunit L3b is held by the second shift lens barrel 3c.

The first shift lens barrel 3b and the second shift lens barrel 3c are fixedly adhered by adhesive 3f after adjustment to eliminate their relative decentering, namely adjustment to align the optical axes of the first lens subunit L3a and the second lens subunit L3b has been effected.

The first shift lens barrel 3b includes a lens holding portion 3d for holding the first lens subunit L3a and coupling portions 3e for coupling the lens holding portion 3d and the second shift lens barrel 3c.

The coupling portions 3e are formed on both sides of the lens holding portion 3d to ensure coupling strength. Since the second shift lens barrel 3c is adhered to the coupling portions 3e of the first shift lens barrel 3b as above, the distance between the first lens subunit L3a and the second lens subunit L3b along the optical axis is constant, and both lens subunits move integrally when image shake correction is actually effected by bending the optical axis A.

A magnet base 3g is fixed on the first shift lens barrel 3b, on which the second shift lens barrel 3c has been integrally attached, by a screw 3i with a metal plate 3h inserted therebetween.

A magnet 3j used for both driving and position detection is press-fitted into the magnet base 3g and supported thereon. Accordingly, the relative position of the magnet base 3g and the magnet 3j will not change after they are assembled together.

The position of the magnet 3j is fixed relative to the first lens subunit L3a and the second lens subunit L3b. Therefore, the positions of the first lens subunit L3a and the second lens subunit L3b can be detected accurately.

Three balls 3k are disposed between the shift base 3a and the magnet base 3g in such a way as to surround the optical axis along a plane orthogonal to the optical axis. Disposed between the ball 3k and the magnet base 3g is the aforementioned metal plate 3h, which may preferably be made, for example, of a stainless steel.

The existence of the metal plate 3h contributes to prevention of deterioration in driving characteristics of the shift unit portion 3 that might be caused if the magnet base 3g, which is a molded part, is deformed by the balls 3k when an impact is applied on the camera.

Between the ball 3k and the shift base 3a, there is provided a ball holder 3l made of a stainless steel or the like formed into a substantially U-shape.

The ball holder 3l is press-fitted into a recessed portion 3m formed on the shift base 3a. The ball 3k is rotatably held in the recessed portion 3m. A preferable material for the ball 3k is, for example, a stainless steel which is not attracted by the magnet 3j disposed in the vicinity thereof.

The force that securely keeping the balls 3k in contact with the shift base 3a and the magnet base 3g is attractive force acting between the magnet 3j and a rear yoke 3n.

The attractive force biases the magnet base 3g toward the shift base 3a, and the three balls 3k are in contact with the end surfaces, with respect to the optical axis direction, of the three ball holders 3l that face the optical axis direction and three points on the metal plate 3h in a pressurized state.

The surfaces to which the three balls 3k abut extend orthogonal to the optical axis A of the photographing optical system.

Since the three balls have the same nominal diameter, it is possible to move the third lens unit L3 in a plane orthogonal to the optical axis without inclination with respect to the optical axis by suppressing positional differences in the optical axis direction among the end surfaces of the three ball holders 3l and positional differences in the optical axis direction among the three positions on the metal plate 3h at which the balls abut it to low levels.

The magnet 3j is magnetized radially from the optical axis A with two poles. A front yoke 3o is attracted by and fixed to the magnet 3j to confine the magnetic flux in the front side, with respect to the optical axis direction, of the magnet 3j.

An electromagnetic coil 3p is fixedly adhered to the shift base 3a. The rear yoke 3n confines the magnetic flux in the rear side in the optical axis direction of the magnet 3j.

The rear yoke 3n is arranged in the opposite side of the magnet 3j with the electromagnetic coil 3p therebetween and held by the shift base 3a. The magnet 3j, the front yoke 3o, the rear yoke 3n and the electromagnetic coil 3p form a magnetic circuit.

Since the magnet base 3g is biased toward the shift base 3a by means of an attractive force acting between the magnet 3j and the rear yoke 3n, it is not necessary to provide a part such as a spring member for biasing. Thus, it is possible to reduce the size of the shift unit portion 3.

This magnetic circuit functions as what is called a moving magnet type actuator. When a current flows through the electromagnetic coil 3p, a Lorentz force is generated, as a result of repulsion between lines of magnetic force generated by the magnet 3j and the electromagnetic coil 3p, in a direction substantially orthogonal to the magnetic boundary of the magnet 3j. The magnet base 3g is moved by the Lorentz force in a direction orthogonal to the optical axis.

Since actuators having the above-described structure are provided for the vertical and horizontal directions of the third lens unit L3, it is possible to drive the third lens unit L3 in two directions that are substantially orthogonal to each other and orthogonal to the optical axis. By synthesizing the vertical drive and the horizontal drive, or the drive in the pitch direction and the drive in the yaw direction, it is possible to move the third lens unit L3 as desired within a predetermined range in a plane orthogonal to the optical axis.

The friction acting while the magnet base 3g moves in a direction orthogonal to the optical axis is only the rolling friction generated between the balls 3k and the metal plate 3h and between the balls 3k and the ball holders 3l. Therefore, the third lens unit L3 can be moved very smoothly in the plane orthogonal to the optical axis in spite of the attractive force between the magnet base 3g and the shift base 3a. In addition, minute control of the movement amount is made possible.

The friction can be further reduced by applying lubricant to the balls 3k.

The position of the third lens unit L3 is detected by a Hall element 3q. The Hall element 3q converts magnetic flux density to an electric signal. The Hall element 3q is soldered to a flexible print cable (FPC) 3s which is attached to a retaining plate 3r, which in turn is fixed to the shift base 3a.

By fixing the FPC 3s to the retaining plate 3r, the FPC 3s is prevented from lifting and the positional displacement of the Hall element 3q is prevented.

When the third lens unit L3 is driven in the vertical or the horizontal direction, a change in the magnetic flux density is detected by the Hall element 3q, and an electric signal indicative of the change in the magnetic flux density is output from the Hall element 3q.

Based on the electric signal from the Hall element 3q, the position of the third lens-unit L3 can be detected. The magnet 3j serves as a magnet for detecting position as well as a magnet for driving.

When the variator moving frame 7 is in the telephoto position, the second lens unit L2 is located just in front of the third lens unit L3.

In this state, the second lens unit L2 is overlapping with the magnet 3j and the front yoke 3o in a plane orthogonal to the optical axis. This relates to the layout that the driving portion of the shift unit portion 3 is disposed in the front side of the light amount adjusting unit 11 in the optical axis direction.

Namely, by disposing a part of the driving means of the shift unit portion 3 and the second lens unit L2 in such a way as to overlap with each other in a plane orthogonal to the optical axis, it is possible to give an anti-shake function to the third lens unit L3 without increasing the size of the shift unit portion 3 while maintaining a short distance between the second lens unit L2 and the third lens unit L3 as with conventional arrangements and achieving a desired magnification.

Figure 5:
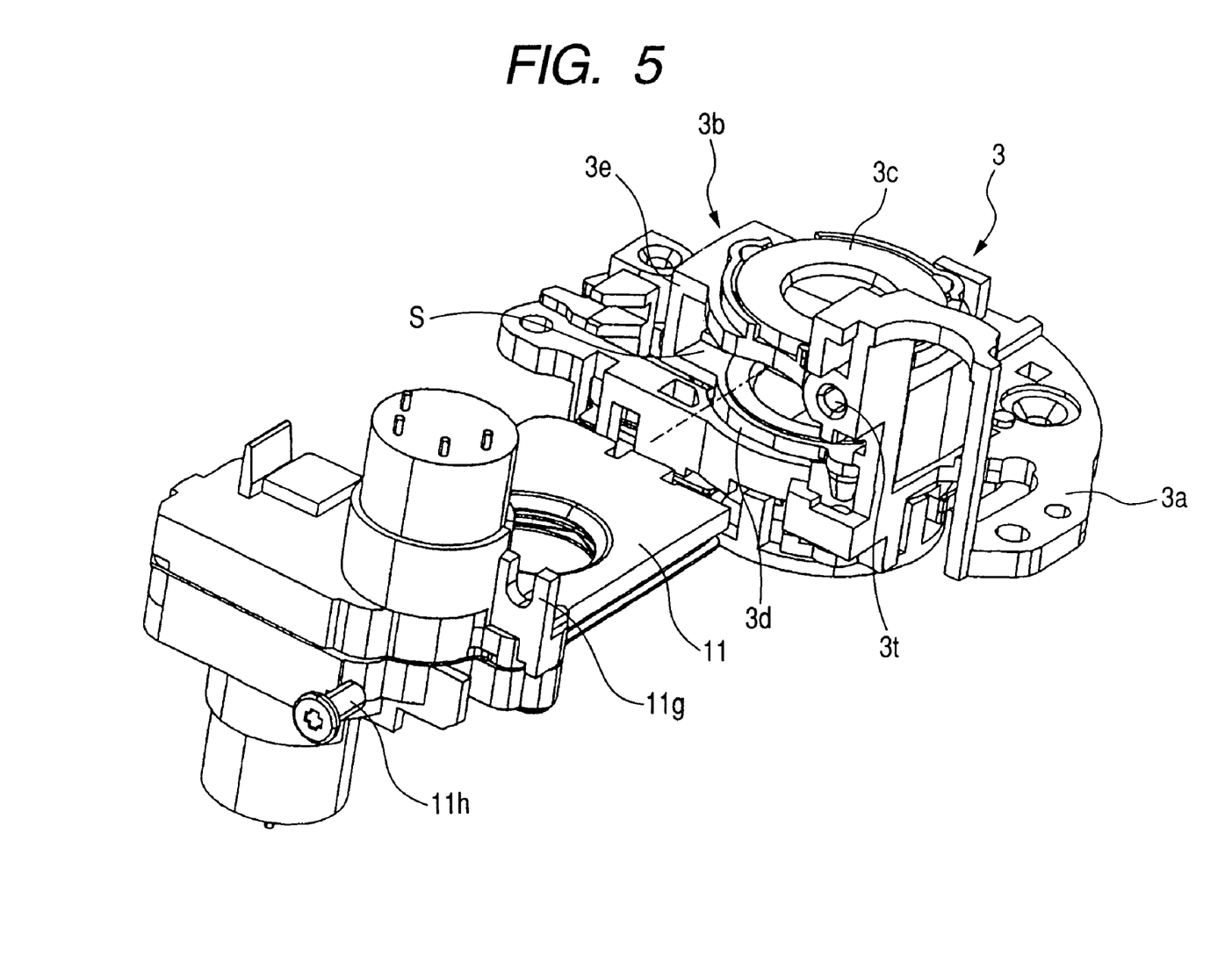
FIG. 5 is a perspective view showing how a light amount adjusting unit is assembled on the shift unit portion.

FIG. 5 is a perspective view showing the light amount adjusting unit 11 and the shift unit portion 3 to be assembled together. As shown in FIG. 4, the thickness, in the optical axis direction, of the light amount adjusting unit 11 in the vicinity of the optical axis is made up by the retaining plate lid, the first diaphragm blade 11a, the second diaphragm blade 11b, a partition plate 11e, diaphragm base plate 11f and the ND filter 11c.

The thickness portion from the retaining plate lid to the ND filter 11c is inserted into the space surrounded by the lens holding portion 3d of the first shift lens barrel 3b, the second shift lens barrel 3c and the coupling portions 3e on both sides from the direction perpendicular to the direction of arrangement of both the coupling portions 3e.

When the light amount adjusting unit 11 is inserted as shown in FIG. 5, a mounting base portion 11g is secured by a screw 11h screwed into a prepared hole 3t for a self tap screw on the shift base 3a. Thus, the thickness portion from the retaining plate 11d to the ND filter 11c is intervening between the first lens subunit L3a and the second lens subunit L3b.

Figure 6:
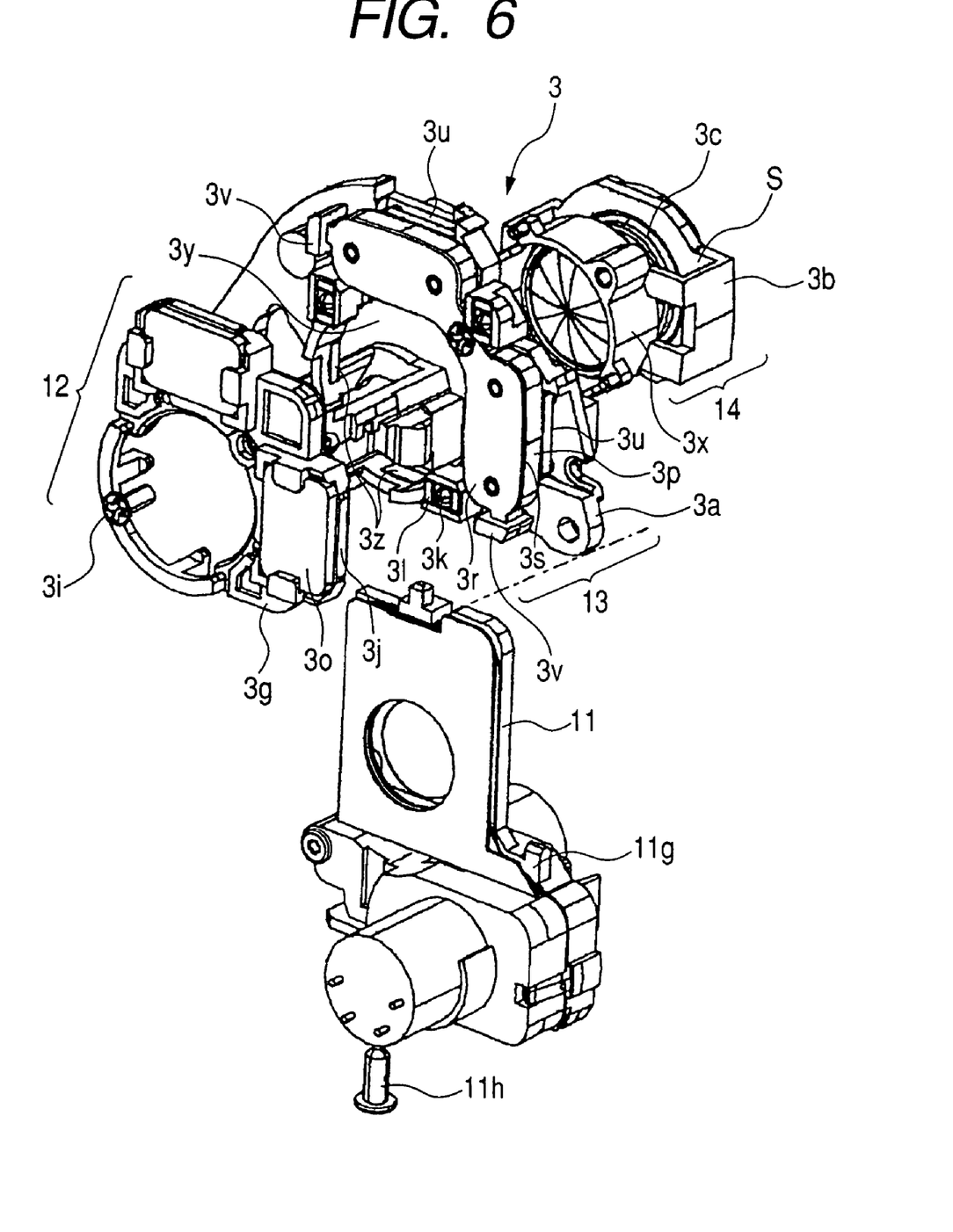
FIG. 6 is an exploded perspective view of the shift unit portion.

FIG. 6 is an exploded perspective view showing principal components of the shift unit portion 3 separately. The shift unit portion 3 is composed of a shift magnet unit 12 mainly composed of the magnet 3j and the front yoke 3o, a coil unit 13 mainly composed of the electromagnetic coil 3p, the Hall element 3q and the rear yoke 3n, and a shifting frame unit 14 mainly composed of the first lens subunit L3a, the second lens subunit L3b, the first shift lens barrel 3b and the second shift lens barrel 3c.

The shift magnet unit 12 is constructed by press-fitting the magnet 3j to the magnet base 3g and then causing the front yoke 3o to slide into the magnet base 3g in the direction orthogonal to the optical axis to press-fit it to the magnet base 3g.

The coil unit 13 is constructed by firstly causing the rear yoke 3n to slide into the shift base 3a in the direction perpendicular to the optical axis to press-fit it to the shift base 3a. It is preferred that adhesive be applied at the interface portion 3u between the rear yoke 3n and the shift base 3a to secure the rear yoke 3n to the shift base 3a more firmly.

After that, the electromagnetic coil 3p is assembled to the shift base 3a in the optical axis direction. Then, the FPC 3s on which the Hall element 3q has already been attached by soldering is put over the electromagnetic coil 3p. Finally, a flexible retaining plate 3r is hooked on a hook portion 3v and secured to the shift base 3a by means of a screw 3w to press the electromagnetic coil 3p and the FPC 3s.

The shifting frame unit 14 is assembled by securing the first shift lens barrel 3b on which the first lens subunit L3a has been fixed by swaging and the second shift lens barrel 3c on which the second lens subunit L3b has been fixed by swaging, using the adhesive 3f as described above.

The shift unit portion 3 is assembled by placing the ball holders 31 and the balls 3k on the coil unit 13 and thereafter setting a part of the shift base 3a and the coil unit 13 between the coupling portion 3e of the shifting frame unit 14 and the shift magnet unit 12.

In this assembling process, the flange portion 3x of the first shift lens barrel 3b is caused to pass through the aperture 3y of the shift base 3a in the frontward direction along the optical axis, and thereafter, the magnet base 3g of the shift magnet unit 12 is fixed by the screw 3i on the front side of the shift base 3a.

As per the above, after a part of the shift base 3a and the coil unit 13 are set between the shifting frame unit 14 and the shift magnet unit 12, the shifting frame unit 14 and the shift magnet unit 12 are secured by the screw 3i.

Thus, if an impact force greater than the attractive force acting between the magnet 3j and the rear yoke 3n is applied from the front side to the camera, the coupling portion 3e of the shifting frame unit 14 will abut the part of the shift base 3a or the coil unit 13 to function as a stopper.

On the other hand, when an impact force is applied from the rear side, the balls 3k will function as stoppers. Thus, it is possible to prevent inoperable state that might be caused by dislocation of the shifting frame unit 14 out of the shift unit portion 3.

Here, the coupling portion 3e, which is originally provided for integrally coupling the first lens subunit L3a and the second lens subunit L3b, is used also as a stopper. Accordingly, it is not necessary to provide a stopper portion independently from the coupling portion 3e. This contributes to simplification of the structure of the shift unit portion 3 and downsizing of the lens barrel 2.

The shift magnet unit 12 and the coil unit 13 are disposed on the front side with respect to the optical axis, of the coupling portion 3e, and they are closer to the optical axis A than the coupling portion 3e is.

In this embodiment, although the provision of the coupling portion 3e leads to a decrease in the space around the outer periphery of the third lens unit L3, the above-described arrangement allows to provide the shift magnet unit 12 and the coil unit 13 without enlarging the diameter of the lens barrel 2.

As described before, after configuring the shift unit portion 3, the light amount adjusting unit 11 is inserted into the space S in the shifting frame unit 14 from the rear side and screwed. By this configuration, it is possible to test the performance of the shift unit 3 in a standalone state before assembling the light amount adjusting unit 11 to it, and the assembling of the light amount adjusting unit 11 can be easily carried out.

Alignment of the optical axis of the third lens unit L3 is effected using wall portions 3z provided in the inner periphery of a bore 3m formed on the shift base 3a as a reference, and the wall portions 3z have the same designed distance from the center of the optical axis A.

While FIG. 4 is a lateral cross sectional view, the wall portions 3z are also arranged at two vertical positions one above the other, and there are four wall portions 3z in all.

The movable portion composed of the shifting frame unit 14 and the shift magnet unit 12 are moved in an optical-axis-orthogonal direction I shown in FIG. 4 and the direction orthogonal thereto so as to be caused to abut the wall portions 3z. Outputs of the Hall element 3q are read at respective abutment positions.

The central position corresponding to the center of the outputs of the Hall element 3 thus read will be the position at which the optical axis of the third lens unit L3 coincides with the optical axis A of the photographing optical system. This position is stored in a memory provided in the camera body 1.

When there is no camera shake, power supply to the electromagnetic coil 3p is controlled in such a way that the movable portion is held at the central position.

As per the above, the shift base 3a is a member having the wall portions 3z used for centering of the movable portion and also serves as the member for holding the electromagnetic coil 3p and the rear yoke 3n. This contributes to reduction in the number of the parts.

Figure 7:
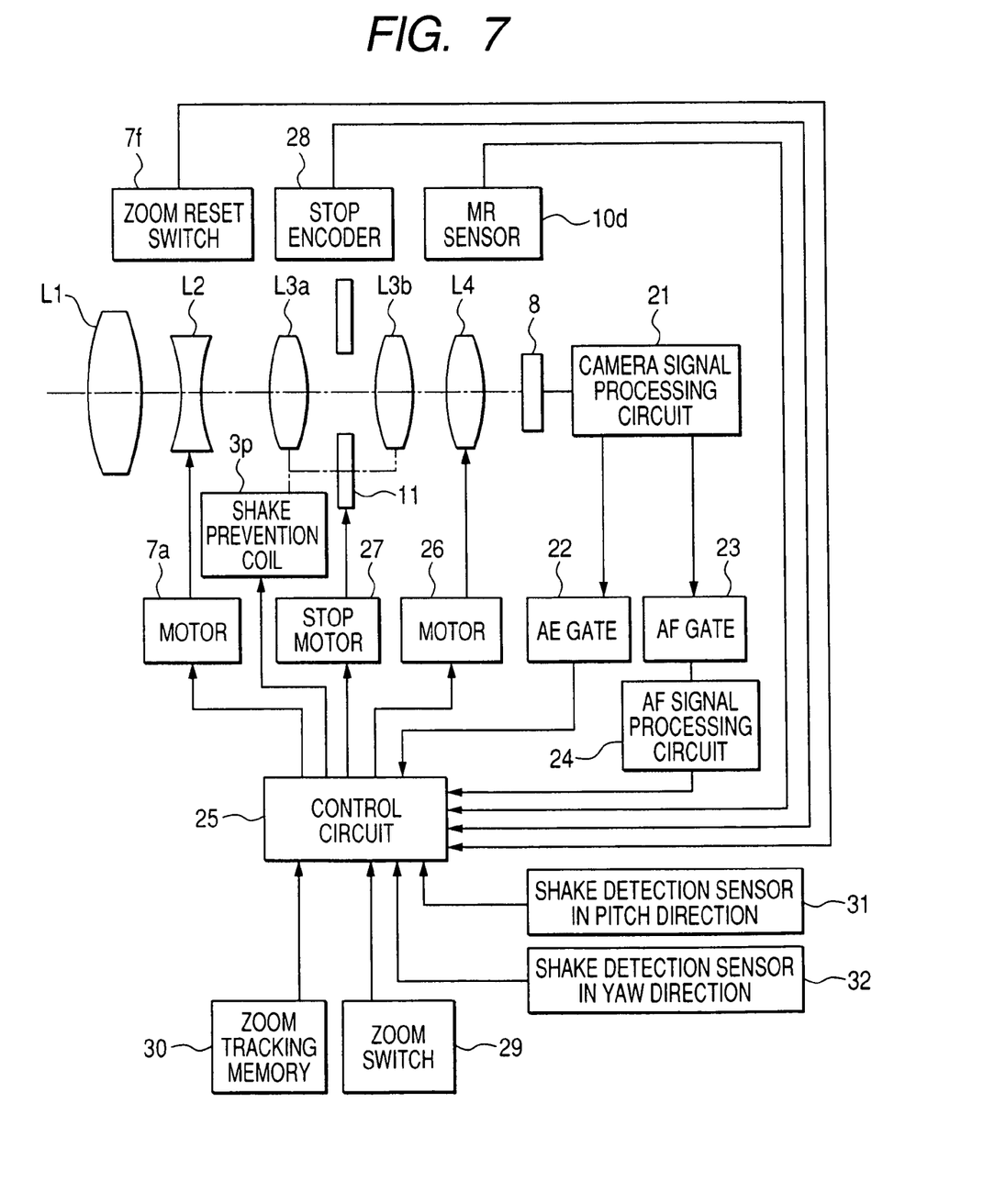
FIG. 7 is a block diagram showing the circuit configuration of the camera.

FIG. 7 is a block diagram showing the circuit configuration, wherein components of the lens barrel 2 shown in FIGS. 1 to 6 are designated by the same reference numerals.

The output of the image pickup element 8 disposed on the image plane of the optical system composed of the first lens unit L1, the second lens unit L2, the first and second lens subunits L3a, L3b and the fourth lens unit L4 is connected to a camera signal processing circuit 21.

The output of the camera signal processing circuit 21 is connected to an AE gate 22 and an AF gate 23 parallely. The output of the AE gate 22 is directly connected to a control circuit 25 that performs control of the camera, and the output of the AF gate 23 is connected to the control circuit 25 via an AF signal processing circuit 24.

The control circuit 25 is connected with a stepping motor 7a serving as a drive source of the second lens unit L2, a voice coil motor 26 serving as a drive source of the fourth lens unit L4, a stop motor 27 serving as a drive source of the light amount adjusting unit 11, the zoom reset switch 7f used for detecting whether or not the second lens unit L2 is at the reference position with respect to the optical axis direction, a stop encoder 28, an MR sensor 10d, the shake prevention electromagnetic coil 3p, a zoom switch 29, a zoom tracking memory 30, a shake detection sensor in pitch direction 31 and a shake detection sensor in yaw direction 32.

After it is detected that the second lens unit L2 is at the reference position, the movement amount of the second lens unit L2 with respect to the optical axis direction from the reference position can be detected by continuously counting the number of pulses input to the stepping motor 7a.

The stop encoder 28 is constructed by, for example, disposing a Hall element in the stop motor 27 to detect rotational relationship between the rotor and the stator.

The camera signal processing circuit 21 performs signal processing such as predetermined amplification and gamma correction on the output from the image pickup element 8. The contrast signal of the image signal that has undergone this processing is supplied to the AE gate 22 and AF gate 23.

The AE gate 22 and the AF gate 23 set signal areas to be taken out that are optimum for exposure control and focusing respectively from the image signal of the whole image area.

The sizes of the AE gate 22 and the AF gate 23 may be variable or plurality of AE gates and/or AF gates may be provided, depending on the case. An AF signal processing circuit 24 that processes AF signals for auto focusing (AF) generates one or multiple outputs with respect to a high frequency component of the image signal.

During zooming, the zoom tracking memory 30 stores the object distance and position information of the fourth lens unit L4 in association with the position of the second lens unit 2. The zoom tracking memory 30 may be constituted by a memory provided in the control circuit 25.

When the zoom switch 29 is operated, for example, by a photographer, the control circuit 25 controls driving of the stepping motor 7a and the voice coil motor 26 in such a way that the count value indicative of the current absolute position of the second lens unit L2 with respect to the optical axis direction and the calculated position to which the second lens unit L2 is to be set coincide with each other and that the count value indicative of the current absolute position of the fourth lens unit L4 with respect to the optical axis direction and the calculated position to which the fourth lens unit L4 is to be set coincide with each other so as to keep a certain positional relationship of the second lens unit L2 and the fourth lens unit L4 computed based on the information stored in the zoom tracking memory 30.

In the auto focusing operation, the control circuit 25 controls driving of the voice coil motor 26 in such a way that the output of the AF signal processing circuit 24 becomes a peak.

To realize an appropriate exposure, the control circuit 25 controls driving of the stop motor 27 to regulate the light amount in such a way that the output of the stop encoder 28 becomes equal to a reference value that is set as the average of the Y signal output that has passed through the AE gate 22.

The control circuit 25 controls power supply to the shake prevention electromagnetic coil 3p based on the outputs from the shake detection sensor in pitch direction and the shake detection sensor in yaw direction, and the signal from the MR sensor to correct image shake by driving the third lens unit L3.

As described above, in this embodiment, image shake correction is effected by driving the first lens subunit L3a and the second lens subunit L3b disposed in front and rear of the light amount adjusting unit 11 in directions orthogonal to the optical axis.

In this arrangement, the magnet 3j and the front yoke 3o that constitute the drive portion of the shift unit 3 are disposed on the front side of the driven portion including the first lens subunit L3a and the second lens subunit L3b, and outside the second lens unit L2.

In other words, in this embodiment, by disposing the drive portion for shake correction, which has been conventionally disposed right beside the driven portion, on the front side, with respect to the optical axis direction, of the driven portion, it is possible to achieve zooming function as in the conventional art without the need to enlarge the diameter of the apparatus, namely without disposing the drive portion outside the light amount adjusting unit 11.

The second lens unit L2 and the first lens subunit L3a may be disposed closer to each other.

Thus, it is possible to realize a small size optical apparatus equipped with an image shake correction apparatus without increases in the total length and the diameter of the zoom lens optical system.

Although the above description of the embodiment has been directed to the case where a moving magnet type actuator is used to drive the third lens unit L3, the present invention can be applied to the case where a moving coil type actuator in which a coil is provided on the third lens unit L3 and a magnet is provided on the shift base 3a is used.

Furthermore, although the above description of the embodiment has been directed to the case where the first lens subunit L3a and the second lens subunit L3b are integrally driven in directions perpendicular to the optical axis, the first lens subunit L3a and the second lens subunit L3b may be adapted to be driven independently from each other. In such cases, separate actuators will be provided for driving the first lens subunit L3a and the second lens subunit L3b respectively.

Although, an image pickup apparatus in which the lens barrel is integrally provided on the camera body has been described as an embodiment, the present invention can be applied to various optical apparatuses such as an interchangeable lens apparatus that is detachably attached to a camera body and an observation device like a binocular having an anti-shake function.

This application claims priority from Japanese Patent Application No. 2004-318120 filed on Nov. 1, 2004, which is hereby incorporated by reference herein.

What is claimed is:

1. An optical apparatus comprising:
   a first movable lens frame that holds a lens that deflects photographing light beams by being driven in a direction orthogonal to an optical axis by a driving unit;
   a second movable lens frame movable in a direction parallel to the optical axis,
   wherein a part of a lens held by the second movable lens frame is arranged to be able to overlap with the driving unit in a direction orthogonal to the optical axis.

2. An optical apparatus according to claim 1, wherein said second movable lens frame is disposed closer to the object than said first movable lens frame is and adapted to move in the direction of said optical axis to effect a zoom function.

3. An optical apparatus according to claim 1, wherein said driving means comprises either a coil member or a magnet member, and the other of the coil member and the magnet member is attached to said first movable lens frame.

4. An optical apparatus according to claim 1, wherein said first movable lens frame holds a plurality of lenses by means of a holding portion, said holding portion is composed of two portions in the form of a first lens holding portion and a second lens holding portion, the optical apparatus further comprising a coupling portion that couples the first holding portion and the second holding portion at both sides with respect to a first optical-axis-orthogonal direction and a light amount adjusting unit disposed in a space surrounded by the first holding portion, the second holding portion and the coupling portion, the light amount adjusting unit having been inserted from a second optical-axis-orthogonal direction that is orthogonal to both the optical axis and the first optical-axis-orthogonal direction.

5. An optical apparatus according to claim 1, wherein said first movable lens frame holds a plurality of lenses by means of a holding portion, said holding portion is composed of two portions in the form of a first lens holding portion and a second lens holding portion, the optical apparatus further comprising a coupling portion that couples the first holding portion and the second holding portion,
   wherein said driving unit is disposed at a position different from the position of said coupling portion with respect to said optical axis direction and closer to the optical axis than the coupling portion.

6. An optical apparatus according to claim 3, wherein said first movable lens frame holds a plurality of lenses by means of a holding portion, said holding portion is composed of two portions in the form of a first lens holding portion and a second lens holding portion, the optical apparatus further comprising a couplinng portion that couples the first holding portion and the second holding portion at both sides with respect to a first optical-axis-orthogonal direction, said driving unit is attached to a base member that supports said first movable lens frame in such a way that the lens driven by said driving unit is movable in a direction orthogonal to the optical axis, and said the other of the coil member and the magnet member and said coupling portion are disposed on opposite sides of said driving unit disposed therebetween with respect to an optical axis direction.

* * * * *